United States Patent
Ashary

(10) Patent No.: US 9,634,335 B2
(45) Date of Patent: Apr. 25, 2017

(54) DUPLEX COATING FOR SOFC INTERCONNECT

(71) Applicant: BLOOM ENERGY CORPORATION, Sunnyvale, CA (US)

(72) Inventor: Adil A. Ashary, San Jose, CA (US)

(73) Assignee: BLOOM ENERGY CORPORATION, Sunnyvale, CA (US)

(*) Notice: Subject to any disclaimer, the term of this patent is extended or adjusted under 35 U.S.C. 154(b) by 183 days.

(21) Appl. No.: 14/567,158

(22) Filed: Dec. 11, 2014

(65) Prior Publication Data

US 2015/0194682 A1 Jul. 9, 2015

Related U.S. Application Data

(60) Provisional application No. 61/925,340, filed on Jan. 9, 2014.

(51) Int. Cl.
| | |
|---|---|
| *H01M 8/02* | (2016.01) |
| *H01M 8/0228* | (2016.01) |
| *H01M 8/021* | (2016.01) |
| *H01M 8/0217* | (2016.01) |
| *C23C 28/04* | (2006.01) |
| *C23C 4/11* | (2016.01) |
| *C23C 4/134* | (2016.01) |
| *H01M 8/2425* | (2016.01) |
| *H01M 8/124* | (2016.01) |

(52) U.S. Cl.
CPC ............ *H01M 8/0228* (2013.01); *C23C 4/11* (2016.01); *C23C 4/134* (2016.01); *C23C 28/04* (2013.01); *H01M 8/021* (2013.01); *H01M 8/0217* (2013.01); *H01M 8/2425* (2013.01); *H01M 2008/1293* (2013.01); *H01M 2300/0074* (2013.01)

(58) Field of Classification Search
None
See application file for complete search history.

(56) References Cited

U.S. PATENT DOCUMENTS

| | | |
|---|---|---|
| 5,326,645 A | 7/1994 | Ashary et al. |
| 5,451,470 A | 9/1995 | Ashary et al. |
| 5,942,349 A | 8/1999 | Badwal et al. |
| 8,241,817 B2 | 8/2012 | Yang et al. |

(Continued)

FOREIGN PATENT DOCUMENTS

| | | |
|---|---|---|
| WO | WO 2011-096939 A1 | 8/2011 |
| WO | WO 2013-130515 A1 | 9/2013 |

OTHER PUBLICATIONS

International Search Report and Written Opinion received in connection with international application No. PCT/US2013/027895; dated Jun. 24, 2013.

(Continued)

*Primary Examiner* — Patrick Ryan
*Assistant Examiner* — Wyatt McConnell
(74) *Attorney, Agent, or Firm* — The Marbury Law Group PLLC

(57) ABSTRACT

A coated interconnect for a solid oxide fuel cell including an interconnect substrate comprising iron and chromium and a first metal oxide coating formed over an air side of the interconnect substrate. The first metal oxide coating is formed from powder particles, wherein substantially all the powder particles have a particle size less than 22 microns.

21 Claims, 2 Drawing Sheets

(56) References Cited

U.S. PATENT DOCUMENTS

| | | | |
|---|---|---|---|
| 2005/0255355 A1 | 11/2005 | Ukai et al. | |
| 2006/0193971 A1 | 8/2006 | Tietz et al. | |
| 2010/0015473 A1 | 1/2010 | Hendriksen et al. | |
| 2010/0178589 A1 | 7/2010 | Kwon et al. | |
| 2011/0281194 A1* | 11/2011 | Higashi | H01M 8/0206 429/458 |
| 2013/0230644 A1 | 9/2013 | Armstrong et al. | |
| 2013/0230792 A1* | 9/2013 | Wilson | H01M 8/0208 429/509 |

OTHER PUBLICATIONS

International Preliminary Report on Patentability received in connection with international application No. PCT/US2013/027895; dated Sep. 12, 2014.

Stevenson, J. W., et al., "SECA Core Technology Program: Materials Development at PNNL," Pacific Northwest National Laboratory, Richland, WA, SECA Core Technology Review Meeting, Lakewood, Co, Oct. 25, 2005.

La O, G. J. et al., "Investigation of Oxygen Reduction Mechanisms Using Cathode Microelectrodes Part I: Experimental Analysis of $La_{1-x}Sr_xMnO_{3-d}$ and Platinum," $207^{th}$ Meeting of the Electrochemical Society, Quebec City, Submitted to Symposium Q1—Ninth International Symposium on SOFCs (SOFC IX), 10 pages, (May 15-20, 2005).

Gorokhovsky, V. I. et al., "Deposition and Evaluation of Protective PVD Coatings on Ferritic Stainless Steel SOFC Interconnects," Journal of the Electrochemical Society, vol. 153, No. 10, pp. A1886-A1893, (2006).

Quadakkers, W. J. et al., "Compatibility of Perovskite Contact Layers between Cathode and Metallic Interconnector Plates of SOFCs," Solid State Ionics, vol. 91, pp. 55-67, (1996).

Yang, Z., "Recent Advances in Metallic Interconnects for Solid Oxide Fuel Cells," International Materials Reviews, vol. 53, No. 1, pp. 39-54, (2008).

Wikipedia (Online), "Thermal Spraying," Free Encyclopedia, pp. 1-8, (2011).

\* cited by examiner

DUPLEX COATING FOR SOFC INTERCONNECT

FIELD

The present invention is directed to fuel cell stacks, specifically to interconnects and methods of making interconnects for fuel cell stacks.

BACKGROUND

A typical solid oxide fuel cell stack includes multiple fuel cells separated by metallic interconnects (IC) which provide both electrical connection between adjacent cells in the stack and channels for delivery and removal of fuel and oxidant. The metallic interconnect is commonly composed of chromium containing alloys which retain its strength and is dimensionally stable at typical solid oxide fuel cell (SOFC) operating conditions, e.g. 700-900 C. However, during operation of the SOFCs chromium in the alloy reacts with oxygen and forms chromia, resulting in degradation of the adjacent SOFCs.

Two of the major degradation mechanisms affecting SOFCs are directly linked to chromia formation of the metallic interconnect component: i) ohmic resistance increase due to the formation of native chromia (i.e., chromium oxide, which can be expressed as $Cr_2O_3$) on the interconnect, and ii) chromium poisoning of the SOFC cathode.

The chromium containing alloy forms the native oxide of chromium oxide ($Cr_2O_3$) at SOFC operating temperatures (700-900 C) in both air and wet fuel atmospheres. Although $Cr_2O_3$ is electrically conductive, the conductivity of this material at SOFC operating temperatures (700-900 C) is relatively low, with values on the order of 0.01 S/cm at 850 C (versus $7.9 \times 10^4$ S/cm for Cr metal). The chromium oxide layer grows in thickness on the surfaces of the interconnect with time and thus the ohmic resistance due to this oxide layer increases with time.

The second degradation mechanism is known as chromium poisoning of the cathode. During fuel cell operation, ambient air (humid air) flows over the air (cathode) side of the interconnect and wet fuel flows over the fuel (anode) side of the interconnect. At SOFC operating temperatures and in the presence of humid air on the cathode side, chromium on the surface of the $Cr_2O_3$ layer on the interconnect reacts with water and evaporates in the form of the gaseous species chromium oxide hydroxide, $Cr_2O_2(OH)_2$. The chromium oxide hydroxide species transports in vapor form from the interconnect surface to the cathode electrode of the fuel cell where it deposits in the solid form as chromia, $Cr_2O_3$. The $Cr_2O_3$ deposits on and in (e.g., via grain boundary diffusion) the SOFC cathodes and/or reacts with the cathode (e.g. to form a Cr—Mn spinel), resulting in significant performance degradation of the cathode electrode. Typical SOFC cathode materials, such as perovskite materials, (e.g., lanthanum strontium manganate ("LSM"), LSC, LSCF, and LSF) are particularly vulnerable to chromium oxide poisoning.

SUMMARY

An embodiment relates to a coated interconnect for a solid oxide fuel cell including an interconnect substrate comprising iron and chromium and a first metal oxide coating formed over an air side of the interconnect substrate. The first metal oxide coating is formed from powder particles, wherein substantially all the powder particles have a particle size less than 22 microns.

Another embodiment relates to a method of making a coated interconnect including providing an interconnect substrate comprising Cr and Fe and coating an air side of the interconnect substrate with a first metal oxide coating formed from metal oxide powder particles over an air side of the interconnect substrate. Substantially all the metal oxide powder particles have a particle size less than 22 microns.

DETAILED DESCRIPTION

Figure 1:
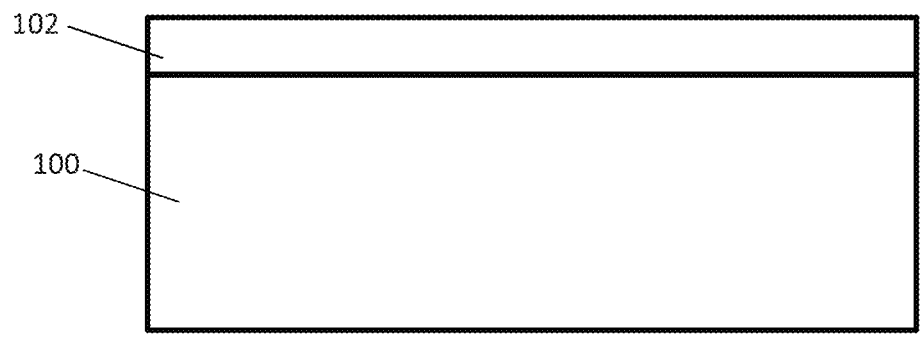
FIG. 1 is a side schematic illustration of an embodiment of an interconnect with a metal oxide coating.

Interconnects may be coated with a single-phase metal oxide coating consisting of either a perovskite or spinel structure to decrease the growth rate of the native chromium oxide layer and suppress the evaporation of the chromium vapor species. Two common candidates are strontium-doped lanthanum manganate (LSM) and manganese cobaltite (MCO), respectively. LSM is an excellent candidate because of its high electrical conductivity at elevated temperatures (i.e., it does not add substantial ohmic resistance), low oxygen conductivity which suppresses oxide growth underneath it on the IC, and low cation conductivity which suppresses solid state diffusion of Cr through the coating.

Alternatively, MCO is a good candidate for IC coating because it forms a Mn and Co-doped Cr-based oxide beneath the coating on the surface of the IC. The Mn and Co-doped Cr-based oxide has higher electrical conductivity than the native chromia layer. Further, this oxide sinters during high-temperature operation which prevents crack formation or the creation of escape pathways for Cr.

In another embodiment, a composite metal oxide layer that includes both spinel and perovskite phases provides better protection against degradation than either the spinel or perovskite phases alone. That is, the composite LSM/MCO coating is designed to utilize the best features of each of the individual coatings discussed above.

The metal oxide coating, such as the composite coating may be deposited on the interconnect using any deposition method, such as, but not limited to air plasma spray (APS). Preferably, the perovskite and spinel are deposited together in one step on the cathode side of the interconnect. For example, APS feedstock powder provided into the plasma in the APS process may comprise a mixture of LSM and MCO powder or their metal oxide precursors having the same weight ratio as that desired for the coating.

In a plasma spray process, a feedstock powder is introduced into a plasma jet or spray, emanating from a plasma source, such as a plasma torch. The feedstock powder is melted in the plasma jet (where the temperature is over 8,000 K) and propelled towards the interconnect substrate. There, the molten droplets flatten, rapidly solidify and form the composite spinel and perovskite coating. Preferably, the feedstock powder comprises MCO and LSM powders having the same composition as the composite spinel and perovskite coating. However, metal (e.g., Mn, Co, La, Sr, or alloys thereof) powder may be used instead and subsequently oxidized to form the MCO spinel coating.

The plasma may be generated by either direct current (e.g., electric arc DC plasma) or by induction (e.g., by providing the plasma jet through a center of an induction coil while a RF alternating current passes through the coil). The plasma may comprise a gas stabilized plasma (e.g., argon, helium, etc,). Preferably, the plasma spraying is air plasma spraying (APS) which is performed in ambient air. Alternatively, a controlled atmosphere plasma spraying (CAPS) method may be used which is performed in a closed chamber, which is either filled with an inert gas or evacuated.

The inventors have discovered that use of a finer starting powder particle size distribution than is conventionally used in forming single phase LSM or MCO coatings with the APS process results in a microstructure which provides a more effective barrier to chromium evaporation. Specifically, the use of a finer starting powder particle size distribution results in a microstructure that has lower porosity, less cracking and a smoother surface finish than coatings made with conventional powder particle size distributions. This results in a coating with better hermetic sealing. Additionally, the improved surface finish of the coating with fine powder may also allow the use of coating that is thinner than the coatings that currently in use. For example, coatings made with a fine starting powder particle size distribution (discussed in more detail below) are 40% thinner than coatings made with a convention powder particle size distribution and exhibit similar long term performance as the thicker coating with the conventional powder.

Characteristics of an example powder particle size distribution according to an embodiment and the conventional powder particle size distribution are compared in Table I below:

TABLE I

| Parameter | Conventional | Example |
| --- | --- | --- |
| D10 | 12 to 18 μm | 6 to 12 μm |
| D50 | 20 to 30 μm | 11 to 17 μm |
| D90 | 35 to 45 μm | 17 to 23 μm |
| D95 | 40 to 50 μm | 20 to 25 μm |
| Maximum Size | >62 μm 2% max | >25 μm 2% max |
| Minimum Size | <11 μm 2% max | <5 μm 2% max |

The "D" number in the first column of Table I refers to the percent undersize according to standard screening procedures. The size may be the diameter or width of the particle. Thus, by definition, for the D10 parameter for the conventional powder distribution, 10 weight percent ("wt %") of the powder particles in the sample should be less than 12 to 18 μm in size. For the D50 parameter, 50 wt % of the powder particles in the sample should be less than 20 to 30 μm in size. For the D90 parameter, 90 wt % of the powder particles in the sample should be less than 35 to 45 μm in size. For the D95 parameter, 95 wt % of the powder particles in the sample should be less than 40 to 50 μm in size. Further, for the conventional powder particle size distribution, there would be ≤2 wt % of particles greater than 62 μm in size and particles less 11 μm in size. In an embodiment, substantially all of the particles in the starting powder of the conventional powder have a size less than 50 μm.

In an embodiment of the powder size distribution as summarized in Table I, for the D10 parameter of the Example powder distribution, 10 wt % of the powder particles in the sample should be less than 6 to 12 μm in size. For the D50 parameter, 50 wt % of the powder particles in the sample should be less than 11 to 17 μm in size. For the D90 parameter, 90 wt % of the powder particles in the sample should be less than 17 to 23 μm in size. For the D95 parameter, 95 wt % of the powder particles in the sample should be less than 20 to 25 μm in size. Further, for the example powder particle size distribution, there should be less than 2 wt % particles greater than 25 μm in size and particles less than 5 μm in size. In an embodiment, substantially all of the particles in the starting powder have a size less than 22 μm.

FIG. 1 illustrates a first embodiment of a composite spinel and perovskite coating 102 on an interconnect substrate 100 to decrease the growth rate of the native chromium oxide layer and suppress the evaporation of the chromium vapor species. In this embodiment, the powder particle size distribution corresponds to the Example powder particle size distribution in Table I above. Further, as discussed above, the composite spinel and perovskite coating 102 may be applied via an air plasma spray (APS) process in one step or via any other suitable deposition process. The thickness of the composite spinel and perovskite coating 102 may be in the range of 20-75 μm, such as 25 to 50 μm.

Figure 2A:
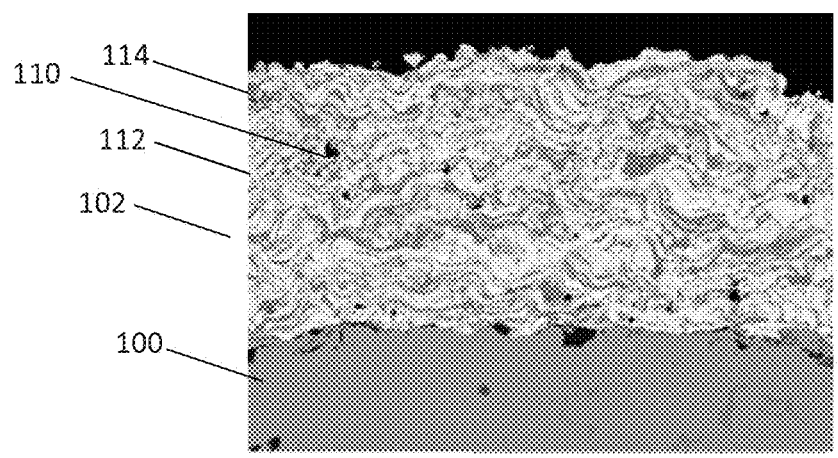
FIG. 2A is a micrograph of an embodiment of an interconnect coated with a composite spinel and perovskite metal oxide coating made from a powder with a fine powder particle size distribution.
Figure 2B:
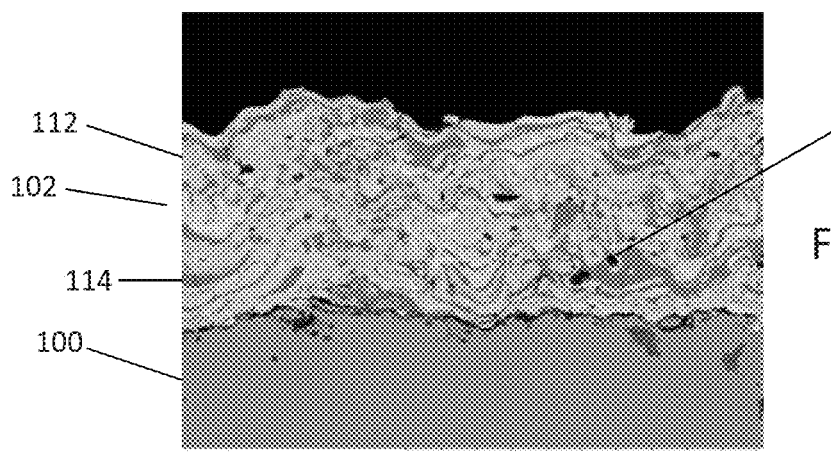
FIG. 2B is a micrograph of a comparative example of an interconnect coated with a composite spinel and perovskite metal oxide coating made from a powder with a conventional powder particle size distribution.

FIG. 2A is a micrograph that illustrates an embodiment of an interconnect substrate 100 coated with a composite spinel and perovskite coating 102 made from a powder with a fine powder particle size distribution as in the Example in Table I above. FIG. 2B is a micrograph that illustrates a comparative example of an interconnect substrate 100 coated with a composite spinel and perovskite coating 102 made from a powder with a conventional powder particle size distribution. The light phase 112 is LSM while the dark phase 114 is MCO. Thus, the LSM and MCO phases are present as distinct regions in the composite coating. Without wishing to be bound by a particular theory, it is believed that the MCO phase may form plate-like or pancake-like (e.g., longer than thicker) structures 114 in the LSM phase matrix 112. However, the structure may be different for different compositions and/or deposition methods of the composite spinel and perovskite coating 102.

As can be seen by comparing the coated interconnect substrates 100, the composite spinel and perovskite coating 102 made with the example powder particle distribution has a finer microstructure with fewer and smaller pores 110 than the composite spinel and perovskite coating 102 made with the conventional powder particle distribution. The micrographs of FIGS. 2A and 2B also illustrate that the surface finish of the composite spinel and perovskite coating 102 made with the example powder particle distribution is smoother than the composite spinel and perovskite coating 102 made with the conventional powder particle distribution.

In addition, the presence of crack-healing pancake-like MCO structures within the composite spinel and perovskite coating 102 suppresses Cr evaporation through cracks generated in the LSM. The presence of LSM stabilizes the composite LSM/MCO coating in reducing atmospheres such that spallation does not occur and coating integrity is maintained. Preferably, the MCO content of the composite coating 102 is sufficiently high to form the Mn—Cr—Co oxide (e.g., spinel 114) scale on the IC, which provides lower ohmic resistance compared to a single-phase LSM coating, which may only form a MnCr oxide spinel on the interconnect surface.

The composition of the composite coating 102 may be any ratio of LSM:MCO as long as there is a mix of the two materials (rather than a bi-layer coating of separate LSM and MCO layers). For example, the perovskite to spinel (e.g., LSM:MCO) weight ratio may range between 20:80 and 90:10, such as 60:40 to 80:20, such as 67:33 and 73:27. The composition of the individual LSM and MCO materials in the composite coating 102 may vary as described above and may have any level or ratio of non-oxygen constituents, and may include other phases besides the perovskite and spinel phase and/or other elements besides Mn, Co, La, Sr and O. For example, the spinel phase 114 of the spinel and perovskite coating 102 may comprise $Mn_{2-x}Co_{1+x}O_4$, where $0 \leq x \leq 1$ and the perovskite phase 112 may comprise $La_{1-x}Sr_xMnO_3$ (LSM), where $0.1 \leq x \leq 0.3$, such as $0.1 \leq x \leq 0$.

Figure 3:
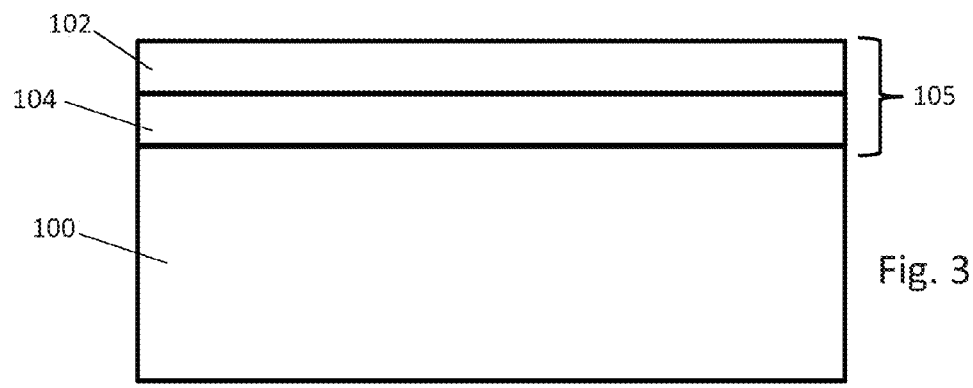
FIG. 3 is a side schematic illustration of an embodiment of an interconnect with a bilayer of two composite spinel and perovskite coatings.

FIG. 3 is a side schematic illustration of an embodiment of an interconnect with a bilayer 105 of two composite spinel and perovskite coatings 102, 104. In an embodiment, the second composite spinel and perovskite coating 104 is made from a conventional powder particle distribution, such as the composition in Table I. As illustrated, the second composite spinel and perovskite coating 104 is located between the interconnect substrate 100 and the first composite spinel and perovskite coating 102. In an alternative embodiment, the relative locations of the composite spinel and perovskite coatings 102, 104 may be reversed. That is, the first composite spinel and perovskite coating 102 may be located adjacent the interconnect substrate 100 with the second composite spinel and perovskite coating 104 on top of the first composite spinel and perovskite coating 102. In embodiments, the thickness of the first composite spinel and perovskite coating 102 may be in the range of 25 to 50 μm while the thickness of the second composite spinel and perovskite coating 104 may be in the range of 25 to 75 μm. In an embodiment, the second composite spinel and perovskite coating 104 is thicker than the first composite spinel and perovskite coating 102. The second composite spinel and perovskite coating 104 is made with particles with a larger average size distribution than the first composite spinel and perovskite coating 102.

The MCO spinel 114 may have the following formula $(M1, M2)_3O_{4\pm0.1}$ where M1 comprises at least 70 atomic percent, such as 70-100 at % manganese, and M2 comprises at least 70 atomic percent, such as 70-100 at % cobalt. M1 and/or M2 may contain additional elements, as will be described with respect to the subsequent embodiments below. The MCO spinel encompasses the compositional range from $M1_2M2_1O_{4\pm0.1}$ to $M2_2M1_1O_{4\pm0.1}$.

In an embodiment, M1 consists of Mn (and unavoidable impurities, if any) and M2 consists of Co (and unavoidable impurities, if any) and the spinel 114 is stoichiometric (i.e., the metal to oxygen atomic ratio is 3:4). The MCO spinel 114 encompasses the compositional range from $Mn_2CoO_4$ to $Co_2MnO_4$. That is, any spinel 114 having the composition $Mn_{2-x}Co_{1+x}O_4$ ($0 \leq x \leq 1$) or written as $z(Mn_3O_4)+(1-z)(Co_3O_4)$, where ($1/3 \leq z \leq 2/3$) or written as $(Mn, Co)_3O_4$ may be used.

Preferably the spinel 114 composition contains at least 25 atomic percent of cobalt oxide, such as 25 to 60 atomic percent cobalt oxide. Another way to phrase this is that the atomic ratio of Co to Mn in the spinel is preferably at least 1:3, such as 1:3 to 6:4, preferably 1:1. Thus, the preferred but non-limiting spinel composition is $Mn_{1.5}Co_{1.5}O_4$ which comprises 50 atomic percent manganese oxide and fifty atomic percent cobalt oxide.

Any suitable chromium containing interconnect substrate 100 may be used. Preferably, the substrate 100 is a chromium based alloy, such as an alloy containing at least 70 weight percent chromium, for example 92 to 97 weight percent chromium, 3 to 7 weight percent iron, and optionally 0 to 1 weight percent of yttrium, yttria, other alloying elements and/or unavoidable impurities. Preferably, the substrate 100 comprises the so-called CrF alloy (e.g., 95 weight percent Cr and 5 weight percent Fe). The alloy may be oxidized on its surface and/or throughout its volume, such that the substrate contains a chromium and/or iron oxide layer on its surface or oxide regions in its volume. However, other suitable substrate 100 materials may be used instead, such as nicrofer, Inconel 600 or X750, Crofer 22 APU or other chromium containing stainless steels.

Preferably, the native oxide layer is removed from the interconnect substrate 100 prior to the deposition of the coating. For example, the native chromia layer may be removed from the CrF interconnect substrate 100 by grinding, polishing, grit blasting, etching or other suitable methods before deposition of the composite spinel and perovskite coating 102 and/or 104, such that the native chromia does not substantially reform prior to deposition of the composite spinel and perovskite coating 102.

The composite spinel and perovskite coating 102 and/or 104 acts as a barrier layer suppressing the diffusion of oxygen from the air stream to the native oxide layer on the interconnect substrate 100. This in turn reduces the growth rate of the native chromia layer and/or an intermediate spinel layer. Coatings that are effective in reducing oxygen transport from the air stream to the native oxide include materials that exhibit low oxygen diffusivity (solid state diffusion of oxide ions), such as spinel phases. The physical characteristics of a good protective coating include having high density, low connected porosity, no microcracking, and complete coverage of the interconnect substrate 100.

Another embodiment of the invention includes doping the spinel powder, e.g. $(Mn, Co)_3O_4$, with Cu to reduce the melting temperature of the spinel. The lowered melting temperature improves (increases) the coating density upon deposition with APS and increases the conductivity of reaction zone oxide. The improvement in the density of the coating due to the lower melting temperature can occur during APS deposition and during operation at SOFC temperature for extended periods of time.

The addition of Cu to the spinel phase has an additional advantage. The Cu doping of the spinel, such as $(Mn, Co)_3O_4$, may result in higher electrical conductivity of the base spinel phase as well as any reaction zone oxides that form between the spinel and the native $Cr_2O_3$ oxide. Examples of electrical conductivities of oxides from the $(Mn, Co, Cu, Cr)_3O_4$ family include: $CuCr_2O_4$: 0.4 S/cm at 800 C, $Cu_{1.3}Mn_{1.7}O_4$: 225 S/cm at 750 C, and $CuMn_2O_4$: 40 S/cm at 800 C.

The spinel family of materials has the general formula $AB_2O_4$. These materials may form an octahedral or cubic crystal structure depending on the elements occupying the A and B sites. Further, depending on the doping conditions, the doped copper may occupy either the A site, the B site or a combination of the A and B sites. Generally, Cu prefers to go into B site. When the A element is Mn, the B element is Co, and the spinel is doped with Cu, the spinel family may be described with the general formula $(Mn, Co, Cu)_3O_4$. More specifically, the spinel family may be described with the following formulas depending on location of the Cu alloying element:

$$Mn_{2-x-y}Co_{1+x}Cu_yO_4 \ (0 \leq x \leq 1), \ (0 \leq y \leq 0.3) \text{ if Cu goes in A site} \quad (1)$$

$$Mn_{2-x}Co_{1+x-y}Cu_yO_4 \ (0 \leq x \leq 1), \ (0 \leq y \leq 0.3) \text{ if Cu goes in B site} \quad (2)$$

$$Mn_{2-x-y/2}Co_{1+y-y/2}Cu_yO_4 \ (0 \leq x \leq 1), \ (0 \leq y \leq 0.3) \text{ if Cu goes equally in both A and B site.} \quad (3)$$

Specific (Mn, Co, Cu)$_3$O$_4$ compositions include, but are not limited to, Mn$_{1.5}$Co$_{1.2}$Cu$_{0.3}$O$_4$, Mn$_{1.5}$Co$_{1.4}$Cu$_{0.1}$O$_4$; Mn$_2$Co$_{0.8}$Cu$_{0.2}$O$_4$ and Co$_2$Mn$_{0.8}$Cu$_{0.2}$O$_4$. Additional compositions include Mn$_2$Co$_{1-y}$Cu$_y$O$_4$, where (0≤y≤0.3), if Cu goes in B site. These composition may also be written, (Mn$_2$O$_3$)+(1−z)(CoO)+z(CuO), where (0≤z≤0.3). Other compositions include Co$_2$Mn$_{1-y}$Cu$_y$O$_4$ where (0≤y≤0.3) if Cu goes in B site. These composition may also be written, (Co$_2$O$_3$)+(1−z)(MnO)+z(CuO) where (0≤z≤0.3). In one preferred Mn, Co spinel composition, the Mn/Co ratio is 1.5/1.5, e.g. Mn$_{1.5}$Co$_{1.5}$O$_4$. When B site doped with Cu, preferred compositions include Mn$_{1.5}$Co$_{1.5-y}$Cu$_y$O$_4$, where (0≤y≤0.3).

In another embodiment, (Mn, Co)$_3$O$_4$ or (Mn, Co, Cu)$_3$O$_4$ spinel families are doped with one or more single valence species. That is, one or more species that only have one valence state. Doping with single valence species reduces cation transport at high temperature. The primary ionic transport mechanism in spinels is through cation diffusion via cation vacancies in the lattice structure. In spinels with multivalent species M$^{2+/3+}$, such as Mn$^{3+/4+}$ and Co$^{2+/3+}$, cation vacancies are generated when M species are oxidized from lower to higher valance states to maintain local charge neutrality. The introduction of a single valence species typically decreases the amount of cation vacancies and decreases the amount of interdiffusion between the composite spinel and perovskite coating 102 and the native Cr$_2$O$_3$ oxide or the CrF interconnect substrate 100. In this manner, the amount of the intermediate oxide layer that forms is decreased. Examples of single valence species that may be introduced into the spinel coating include Y$^{3+}$, Al$^{3+}$, Mg$^{2+}$ and/or Zn$^{2+}$ metals. In an aspect, the spinel coating has a composition of (Mn, Co, M)$_3$O$_4$, where M=Y, Al, Mg, or Zn. For example, if M=Al doped in the A position, then the spinel compositions may include Mn$_{2-y}$Al$_y$CoO$_4$ (0≤y≤0.3) or (1−z)(Mn$_2$O$_3$)+z(Al$_2$O$_3$)+CoO, where (0≤z≤0.15).

In another embodiment, a second phase is added to a (Mn, Co)$_3$O$_4$ spinel or composite coating 102/104 to act as a getter for impurities, such as sulfur and silicon. In this manner, the adhesion of the coating to the CrF interconnect substrate 100 may be improved. Metal oxide phases, such as non-spinel metal oxides, for example, Al$_2$O$_3$, Y$_2$O$_3$, or TiO$_2$ may be added to the composite spinel and perovskite coating 102 as another phase. In one aspect, when the metal oxide phase is alumina, the coating composition may be (1−x)(Mn, Co)$_3$O$_4$ and x(Al$_2$O$_3$), where (0≤x≤0.02). In this case, the Al$_2$O$_3$ primarily exists as a second phase and not as a doping agent in the spinel structure. During deposition and at SOFC operation temperatures, however, some interdiffusion may occur. In this case, aluminum, yttrium or titanium doping of the spinel phase will occur.

Figure 4:
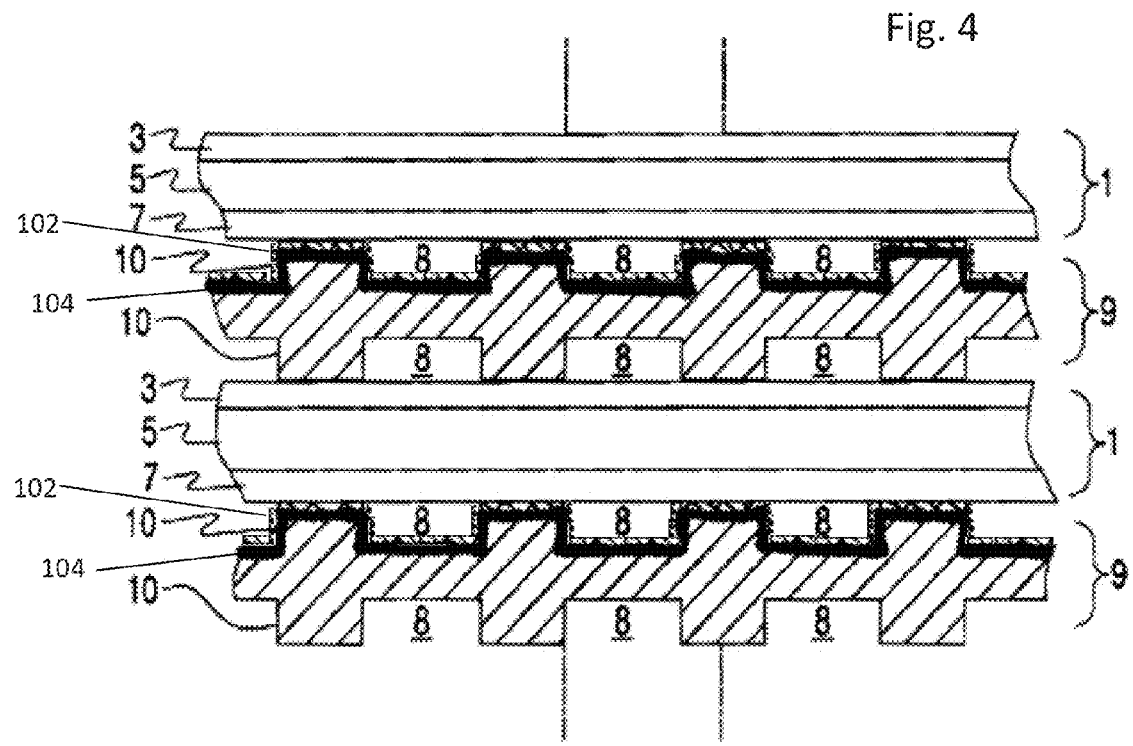
FIG. 4 is a side schematic illustration of an embodiment of a solid oxide fuel cell stack which includes an interconnect with a composite spinel and perovskite coating.

An example of a solid oxide fuel cell (SOFC) stack is illustrated in FIG. 4. Each SOFC 1 comprises a cathode electrode 7, a solid oxide electrolyte 5, and an anode electrode 3. Fuel cell stacks are frequently built from a multiplicity of SOFC's 1 in the form of planar elements or other geometries. Fuel and air is provided to the electrochemically active surfaces of the anode 3 and cathode 7 electrodes, respectively. The interconnect 9 containing gas flow passages or channels 8 between ribs 10, separates the individual cells in the stack. The interconnect 9 electrically connects the anode or fuel electrode 3 of one cell 1 to the cathode or air electrode 7 of the adjacent cell 1. The interconnect 9 separates fuel, such as a hydrocarbon fuel, flowing in the fuel channels 8 between ribs 10 on the fuel side of the interconnect to the fuel electrode (i.e. anode 3) of one cell 1 in the stack, from oxidant, such as air, flowing in the air channels 8 between ribs 10 on the air side of the interconnect to the air electrode (i.e. cathode 7) of an adjacent cell 1 in the stack. At either end of the stack, there may be an air end plate or fuel end plate (not shown) for providing air or fuel, respectively, to the end electrode. FIG. 4 shows that the lower SOFC 1 is located between two interconnects 9.

As shown in FIG. 4, the composite spinel and perovskite coating 102 or 102/104 bilayer is located over the ribs 10 and the air channels 8 on the air side of the interconnects 9 facing the adjacent SOFC 1 cathode 7 in the stack. In addition, the composite spinel and perovskite coating 102 or 102/104 bilayer may be coated on the end plates.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A coated interconnect for a solid oxide fuel cell, comprising:
   an interconnect substrate comprising iron and at least 90% chromium; and
   a first metal oxide coating formed over an air side of the interconnect substrate;
   wherein the first metal oxide coating is formed from powder particles, wherein substantially all the powder particles have a particle size less than 22 microns.

2. The coated interconnect of claim 1, wherein at least 95% of the powder particles have a particle size less than 25 microns.

3. The coated interconnect of claim 1, wherein the first metal oxide coating is formed from powder particles having a powder particle size distribution with D10 of particles of size 6 to 12 μm; D50 of particles of size 11 to 17 μm; D90 of particles of size 17 to 23 μm; D95 of particles of size 20 to 25 μm; and 2% of the particles having a minimum size <5 μm.

4. The coated interconnect of claim 1, wherein first metal oxide coating comprises a composite perovskite and spinel metal oxide coating.

5. The coated interconnect of claim 4, wherein the perovskite to the spinel weight ratio ranges between 60:40 and 80:20.

6. The coated interconnect of claim 5, wherein the perovskite to the spinel weight ratio ranges between 67:33 and 73:27.

7. The coated interconnect of claim 4, wherein the spinel comprises manganese cobalt oxide having a formula Mn$_{2-x}$Co$_{1+x}$O$_4$, where 0≤x≤1, and the perovskite comprises lanthanum strontium manganate having a formula La$_{1-x}$Sr$_x$MnO$_3$ (LSM), where 0.1≤x≤0.3.

8. The coated interconnect of claim 1, further comprising a second metal oxide coating formed under the first metal oxide coating and over the air side of the interconnect substrate.

9. The coated interconnect of claim 8, wherein the second metal oxide coating is formed from powder particles having a powder particle size distribution with D10 of particles of size 12 to 18 µm; D50 of particles of size 20 to 30 µm; D90 of particles of size 35 to 45 µm; D95 of particles of size 40 to 50 µm; and 2% of the particles having a minimum size <11 µm.

10. The coated interconnect of claim 8, wherein at least 95% of the powder particles of the second metal oxide coating have a particle size less than 40 microns.

11. The coated interconnect of claim 8, wherein first metal oxide coating comprises a first composite perovskite and spinel metal oxide coating, and the second metal oxide coating comprises a second composite spinel and perovskite metal oxide coating.

12. The coated interconnect of claim 8, wherein the first metal oxide coating has a thickness between 25-50 microns and the second metal oxide coating has a thickness between 25-75 microns.

13. The coated interconnect of claim 8, wherein the first metal oxide coating has a first thickness, the second metal oxide coating has a second thickness, and the second thickness is 100%-200% greater than the first thickness.

14. A method of making a coated interconnect comprising:
providing an interconnect substrate comprising and at least 90% Cr; and
coating an air side of the interconnect substrate with a first metal oxide coating formed from metal oxide powder particles over an air side of the interconnect substrate, wherein substantially all the metal oxide powder particles have a particle size less than 22 microns.

15. The method of claim 14, wherein the first metal oxide coating is applied with an air plasma coating process.

16. The method of claim 14, wherein at least 95% of the metal oxide powder particles have a particle size less than 22 microns.

17. The method of claim 14, wherein first metal oxide coating comprises a composite perovskite and spinel metal oxide coating, the spinel comprises manganese cobalt oxide and the perovskite comprises lanthanum strontium manganate.

18. The method of claim 17, wherein the perovskite to the spinel weight ratio ranges between 60:40 and 80:20.

19. The method of claim 14, further comprising coating the air side of the interconnect substrate with a second metal oxide coating prior to the coating the air side of the interconnect substrate with the first metal oxide coating.

20. The method of claim 19, wherein:
the first metal oxide coating is formed over the second metal oxide coating; and
the second metal oxide coating is formed from powders particles.

21. The method of claim 20, wherein the first metal oxide coating has a first thickness, the second metal oxide coating has a second thickness, and the second thickness is 100%-200% greater than the first thickness.

* * * * *